Dec. 12, 1967    H. A. KLIEVES    3,357,126
OUTRIGGER CLIP
Filed March 7, 1966

HAROLD A. KLIEVES
INVENTOR.
BY Ernest Carl Edge 3,357,126
OUTRIGGER CLIP
Harold A. Klieves, 4450 NE. 22nd Ave.,
Pompano Beach, Fla. 33064
Filed Mar. 7, 1966, Ser. No. 532,252
8 Claims. (Cl. 43—43.12)

This invention relates in general to a line holding device and in more particularity to a device known as an outrigger clip for holding a trolling line while sport fishing.

In deep sea fishing it is common practice to hold trolling lines at an elevated position relative to the boat by means of outriggers which are merely small auxiliary booms or masts extending upwardly and outwardly from the boat itself.

To hold the trolling lines an endless loop is usually run through pullings at the top and bottom of the outrigger and a detachable line-holding means is secured to the endless loop. The most common means for holding the line is a variation of the ordinary clothespin which releases the line when a fish strikes the bait and pulls on the line.

The greatest disadvantage in using a clothespin is that there is no way of adjusting the holding power of the clothespin so that the line is released when a pre-selected amount of tension is applied to the line.

To my knowledge, no satisfactory clip has heretofore been invented which permits a simple positive adjustment of the amount of frictional engagement between the jaws of the outrigger clip.

It is the primary object, therefore, of this invention to provide an outrigger clip which provides an adjusting means so as to pre-select the amount of tension necessary to release the line from engagement with the clip.

It is a further object of my invention to provide an outrigger clip which can be easily and quickly adjusted and clamped to the line in such a manner as to insure a uniform release of the line each time it is withdrawn.

A still further object of my invention is to provide an outrigger clip which is sturdy in construction, light in weight, economical in price, and relatively simple to manufacture.

Further features, objects, and advantages will either be specifically pointed out or become apparent when, for a better understanding of the invention, reference is made to the following written description taken in conjunction with the accompanying drawing, in which.

Figure 1:
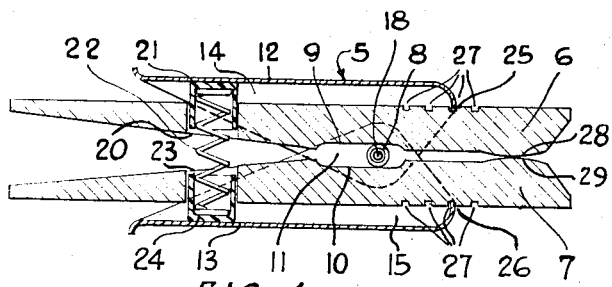
FIGURE 1 is a cross-sectional view taken substantially on the lines 1—1 of FIGURE 2.
Figure 2:
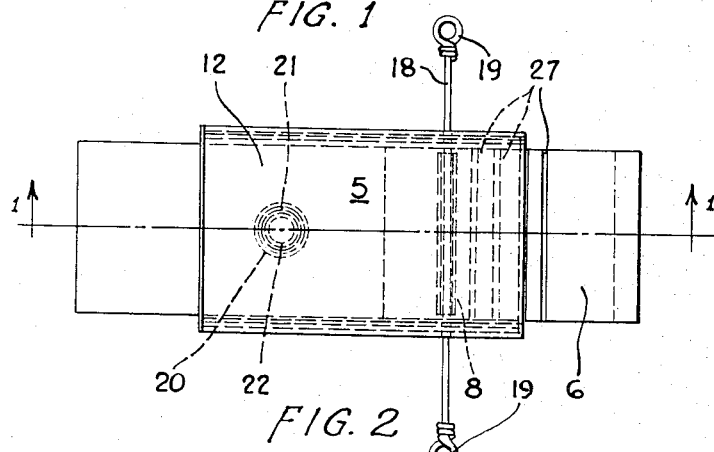
FIGURE 2 is a top plan view of a clip according to my invention.
Figure 3:
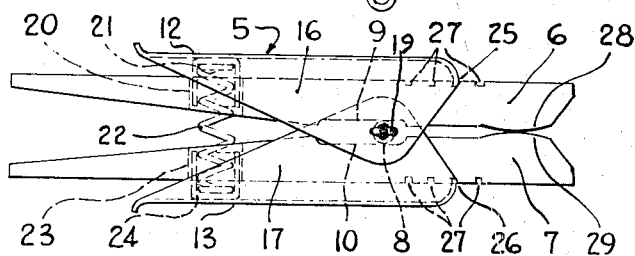
FIGURE 3 is a side elevational view.

Referring now to the drawing, the outrigger clip 5 is shown as consisting of two jaws 6 and 7 each placed on either side of pivot pin 8. Jaw 6 is provided with a cut out 9 and jaw 7 is provided with a cut out 10 which, when the clip is assembled for use, form a cavity 11 along which pivot pin 8 moves in a manner described in detail below.

Placed outwardly of jaws 6 and 7 are a second pair of jaws 12 and 13.

Jaw 12 has two depending side members 14 and 16, while jaw 13 has two depending side members 15 and 17.

When the clip is assembled sides 14 and 16 of jaw 12 extend down over the edges of jaw 6 and sides 15 and 17 of jaw 13 extend upwardly over the edges of jaw 7 with sides 14 and 15 overlapping in side-by-side relationship and sides 16 and 17 also overlapping in side-by-side relationship.

Extending through side members 16 and 17, through the inside of pivot pin 8, and also through side members 14 and 15 is rod 18. Rod 18 has a closed loop 19 on each end thereof for fastening the endless loop 32 thereto.

Jaw 6 is provided with a hole 20 through which spring holder 21 may travel in a sliding relationship. Jaw 7 is provided with a hole 23 through which spring holder 24 may travel in a sliding relationship.

Spring holder 21 is urged upwardly against the bottom surface of jaw 12 and spring holder 24 is urged downwardly against the bottom surface of jaw 13 by spring 22.

Jaw 12 is also provided with a forward gripping edge 25 while jaw 13 is provided with a forward gripping edge 26. The top side of jaw 6 and the bottom side of jaw 7 are each provided with a plurality of laterally extending grooves 27 into which gripping edges 25 and 26 are designed to fit.

The bottom side of jaw 6 is provided with a convex gripping surface 28 while the top side of jaw 7 is provided with a convex gripping surface 29 to provide surer and more reliable holding power when the fishing line is placed between the two surfaces.

Figure 4:
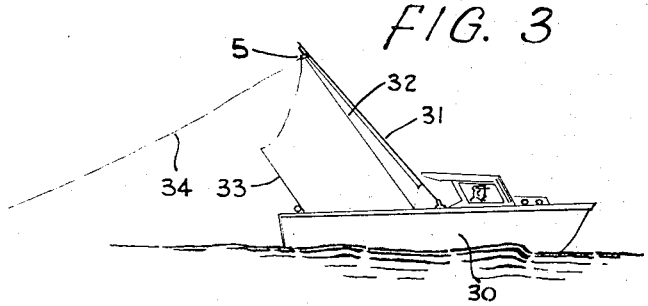
FIGURE 4 is an elevational view of a fishing boat showing an outrigger holding the fishing line aloft.

Operation of my outrigger clip is illustrated in FIGURE 4. In a fishing boat 30 is shown a typical outrigger 31 and a typical fishing rod 33 with line 34. Endless loop 32 has clip 5 inserted therein and clip 5 is holding line 34 between the convex surfaces 28 and 29. When a fish strikes the bait on line 34, if sufficient tension is placed on line 34, the jaws of clip 5 will release the line. To reset the line for a subsequent attempt to catch a fish, endless loop 32 is moved so that clip 5 is near the boat 30. The rear ends of jaws 6 and 7 are grasped and squeezed toward each other against the action of spring 22 transmitted through jaws 12 and 13. This separates the surfaces 28 and 29 thus permitting the fisherman to insert the line therebetween. When the ends of jaws 6 and 7 are released, the jaws will hold line 34 in a frictional relationship between the surfaces 28 and 29.

If it is desired that the amount of tension necessary to remove the line 34 from the jaws 6 and 7 be changed, the rearward surfaces of jaws 12 and 13 are grasped and squeezed toward each other. Due to pivot pin 8 gripping edges 25 and 26 will be removed from grooves 27. Jaws 12 and 13 may then be moved in a slideable relationship in regard to jaws 6 and 7 with spring holders 21 and 24 remaining in position and jaws 12 and 13 moving relative thereto. The jaws 12 and 13 slide over the ends of spring holders 21 and 24 as they are not attached thereto.

As jaws 12 and 13 are moved, pivot pin 8 and enclosed rod 18 also move relative to jaws 6 and 7 with the cavity 11 formed by cut outs 9 and 10 providing space for longitudinal travel thereof.

Changing the location of pivot pin 8 changes the fulcrum length of jaws 6 and 7 thereby either increasing or decreasing the holding power of surfaces 28 and 29.

Note will be taken that by movement of the jaws 12 and 13 relative to the jaws 6 and 7 does not result in a simple linear change of fulcrum length. Due to the fact that pivot pin 8 is physically connected to jaws 12 and 13 through rod 18 these members 12, 13 and 8 all move the same distance at any one time. This movement of pin 8 changes the pivot point of jaws 6 and 7.

To illustrate this in another way, referring to FIGURE 1, if jaws 12 and 13 are squeezed together and gripping edges 25 and 26 are moved to the right so as to fall into the last groove 27 toward the right, the amount of change of force or holding power between surfaces 28 and 29 is the summation of the increased force due to the movement of the gripping edges the distance between the two lateral grooves plus the increased force due to the shortening of the fulcrum length of jaws 6 and 7 relative to pivot pin 8.

The advantage of this arrangement is that a greater change in holding power can be accomplished by a relatively small adjustment of the outer jaws relative to the inner jaws and the entire clip provides a wider range of adjustability, this provides the fisherman with a wide range of holding powers and yet the overall size of the clip is not unwieldy and cumbersome.

Viewing the clip as shown in the drawing movement of jaws 12 and 13 to the last groove 27 toward the right will provide the greatest holding power while movement to the last groove 27 toward the left will provide the least holding power.

The number of grooves 27 and the spacing thereof is a matter of choice and it not to be considered critical to my invention.

Although only one embodiment of my invention has been shown, it is understood that it is not intended to be exhaustive nor limiting of the invention, but on the contrary, is given for purposes of illustration in order that others skilled in the art may fully understand the invention and the principles thereof, and the manner of applying it in practical use so that they may modify and adapt it in various forms, each as may be best united to the conditions of a particular use, and still be within the scope of my invention.

What is claimed is:
1. A line holding clamp device comprising:
   (a) a first pair of pivoted jaw members biased together,
   (b) a second pair of jaw members placed outwardly from said first pair of jaw members,
   (c) said second pair of jaw members gripping said first pair of jaw members, and
   (d) means for adjusting said second pair of jaw members relative to said first pair of jaw members.
2. A line holding clamp device according to claim 1 with
   (e) the ends of said second jaw members being forcibly held apart by said bias means so as to cause the second jaw members to grip said first jaw members.
3. A line holding clamp device according to claim 1 with
   (f) both pairs of jaw members being pivoted around the same pivot point.
4. A line holding clamp device according to claim 1 with
   (g) both pairs of jaw members being pivoted around the same pivot point, and
   (h) a rod extending through said pivot point for attachment to a line.
5. A line holding clamp device according to claim 1 with
   (i) said adjusting means between the two pairs of jaw members comprising a series of lateral slots placed longitudinally on the outside of said first pair of jaw members.
6. A line holding clamp device according to claim 1 with
   (j) the ends of said second pair of jaws being held in a spaced apart relationship by means of a spring.
7. A line holding clamp device according to claim 1 with
   (k) the pivot point of the second pair of jaw members being stationary relative thereto.
8. A line holding clamp device according to claim 7 with
   (l) the pivot point of the first pair of jaw members being movable relative thereto.

References Cited

UNITED STATES PATENTS

| | | | |
|---|---|---|---|
| 718,278 | 1/1903 | Pitts | 24—251 |
| 2,749,648 | 6/1956 | Schneider | 43—43.12 X |
| 3,026,646 | 3/1962 | Weaver | 24—132 X |

BERNARD A. GELAK, *Primary Examiner.*